United States Patent [19]
Akiyama

[11] 3,784,016
[45] Jan. 8, 1974

[54] AUTOMATIC CONTINUOUSLY BACKFLOW WASHING-TYPE FILTER

[75] Inventor: Jiro Akiyama, Yokohama, Japan

[73] Assignee: Kanagawa Kiki Kogyo Co., Ltd., Yokohama-shi, Japan

[22] Filed: May 16, 1972

[21] Appl. No.: 253,871

[30] Foreign Application Priority Data
June 30, 1971 Japan.............................. 46/56187

[52] U.S. Cl................. 210/333, 210/335, 210/412, 210/415
[51] Int. Cl............................................. B01d 33/02
[58] Field of Search............ 210/333–335, 411, 412

[56] References Cited
UNITED STATES PATENTS
3,557,959 1/1971 Muller........................... 210/333 X
3,357,566 12/1967 Schmid et al....................... 210/333
FOREIGN PATENTS OR APPLICATIONS
1,216,449 4/1960 France.............................. 210/335

Primary Examiner—Samih N. Zaharna
Assistant Examiner—Robert H. Spitzer
Attorney—E. F. Wenderoth et al.

[57] ABSTRACT

An automatic backflow washing-type filter comprising a primary filtering unit a substantial area portion of which is employed to primarily filter a charge of oil to be filtered, a filtrate accumulation unit for accumlating and supplying a substantial portion of the filtrate from said primary filtering unit to a consuming device and for recycling the remaining minor portion of the filtrate as a backflow washing filtrate. This washing filtrate washes the primary unit to remove foreign matter deposited on the primary filtering unit. In addition, the device includes a secondary filtering unit for filtering said backflow washing filtrate containing foreign matter after the washing of the primary filtering unit, the secondary filtering unit also being washed while filtering the backflow washing filtrate from the washing operation on the primary filtering unit.

1 Claim, 13 Drawing Figures

Fig.10A   Fig.10B   Fig.10C
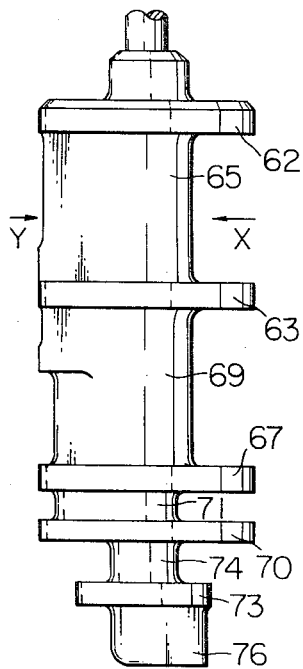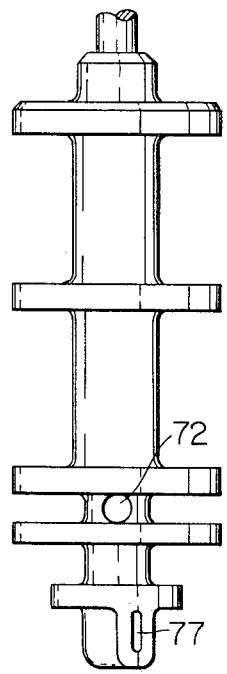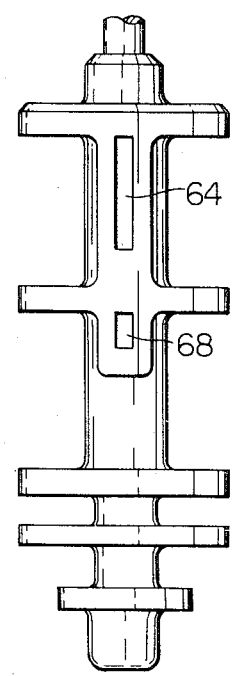
Fig. 11
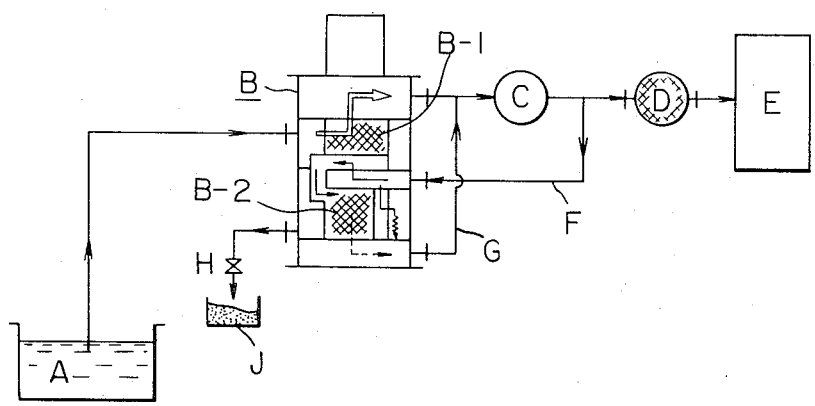

AUTOMATIC CONTINUOUSLY BACKFLOW WASHING-TYPE FILTER

BACKGROUND OF THE INVENTION

This invention relates to an automatic continuous backflow washing-type filter provided with a backflow washing filtrate processing device for use on the suction side of a pump.

A great variety of filters adapted to be connected to the suction side of a pump have been proposed. One of the prior art filters is provided with two juxtaposed filtering screens for alternate filtering operation and is operated in such a manner that one screen performs a filtering operation while the other screen is being washed to remove therefrom the foreign matter deposited thereon when it previously performed a filtering operation. In such a prior art filter, when differential pressure having a predetermined value develops in the filter or the filtering screen or the screens have become clogged up with foreign matter deposited thereon, the screen washing is performed periodically by the setting of a timer. And the washing liquid once employed in the washing of the screen or screens has to be immediately discarded or is temporarily accumulated in a storage tank. The used liquid can then be returned from the storage tank to an original or supply tank after it has been passed through a purifying device. However, such discarding or recycling of the washing liquid is quite uneconomical.

SUMMARY OF THE INVENTION

An object of the present invention is to provide an improved continuous backflow washing-type filter in which the screen washing operation is effected by the use of pressurized backflow washing liquid pumped from a pump thereby to simplify the screen washing operation in the filter.

Another object of the present invention is to provide a filter in which a substantial area of a filtering screen filters contaminated or material oil while the remaining minor area of the screen is being washed with backflow washing filtrate pumped from a pump thereby to improve the screen washing efficiency of the filter and also to make it possible to minimize the overall size of the filter.

Another object of the present invention is to provide an economical filter in which backflow washing liquid which was used for washing a primary filtering screen is passed through a secondary filtering screen to be filtered thereby and the filtered liquid is recycled to the suction side of a pump thereby minimizing waste of the backflow washing liquid and discarding only concentrated sludge, if any.

A further object of the present invention is to provide a practical filter in which the screen washing operation is automatically effected by the use of a backflow washing cock which is incorporated within the filter and rotates at a low rate.

The general operation of the filter of the invention will be briefly described referring to FIG. 11 of the accompanying drawings. Material oil to be filtered is pumped up from a tank A into the filter B of the invention by the suction of a pump C. The material oil is filtered by being passed through a substantial area of a primary filtering screen B – 1 and the filtrate is then sent through the pump C and a filter D on the discharge side of the pump to a consuming device E. The primary filtering screen B – 1 is frequently clogged up with foreign matter which was contained in and separated from the material oil. According to the present invention, a minor area of the primary filtering screen is washed with backflow liquid (F) under pressure which is supplied from the pump C while a substantial area of the screen is performing the oil filtering operation. The backflow washing liquid which washed the primary filtering screen and which now contains foreign matter is passed through a secondary filtering screen B – 2 to be filtered thereby and is recycled to the suction side (G) of the pump C. A minor area of the secondary filtering screen is being washed with liquid (F) under pressure which is supplied from the discharge side of the pump C while a substantial area of the screen is performing the filtering operation. The foreign matter removed from the secondary filtering screen is allowed to deposit on the bottom of the filter and is periodically discharged into a sludge sump J by opening a drain valve H provided on the filter in a lower portion thereof.

The above and other objects and attendant advantages of the present invention will be more readily apparent to those skilled in the art from a reading of the following detailed description of the invention in conjunction with the accompanying drawings which show one preferred embodiment of the invention for illustration purpose only, but not for limiting the scope of the same in any way.

BRIEF DESCRIPTION OF THE DRAWINGS

FIG. 10A is a fragmentary front view in elevation of a backflow washing cock employed in said filter of FIG. 1;

FIG. 10B is a view in elevation of said cock as seen in the arrow X direction or on the right-hand side of FIG. 10A;

FIG. 10C is a view in elevation of said cock as seen in the arrow Y direction or left-hand side of FIG. 10A; and FIG. 11 is a schematic view showing the operation of the filter shown in FIG. 1.

PREFERRED EMBODIMENT OF THE INVENTION

Figure 1:
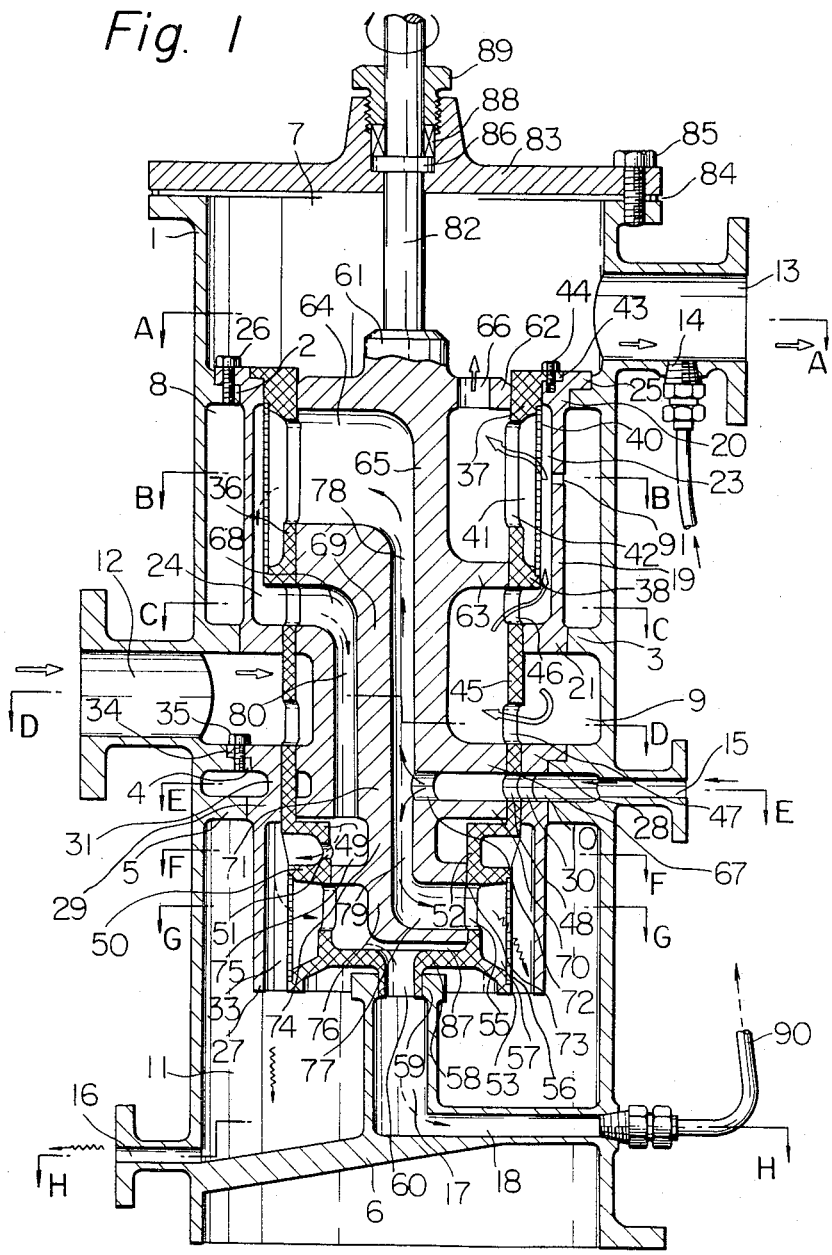
FIG. 1 is a vertical sectional view of one form of an automatic continuous backflow washing-type filter according to the present invention.
Figure 2:
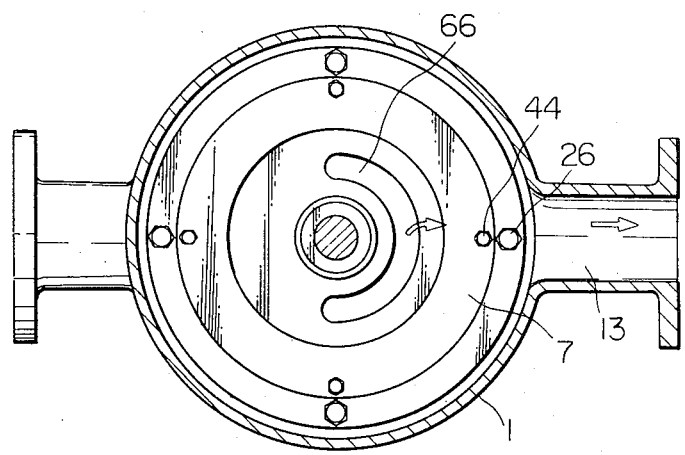
FIG. 2 is a cross-sectional view taken substantially along the line A — A of FIG. 1.

The present invention will now be described referring to the accompanying drawings and more particularly to FIG. 1 thereof. The filter of the invention generally comprises a vertical hollow cylindrical housing or main body 1, the hollow interior of which is divided from top to bottom into five chambers: an oil outlet chamber 7, a filtering chamber 8, a material oil inlet chamber 9, a backflow washing filtrate inlet chamber 10 and a condensation chamber 11. These divisions are defined by radially and inwardly extending annular flanges 2, 3, 4 and 5, respectively, which are integrally formed on the side wall of the housing in vertically spaced positions. In addition, the lower part of chamber 11 is closed by a bottom wall 6. The adjacent flanges 3 and 4 which define the oil inlet chamber 9 have extensions which extend outwardly of the housing 1 on one side thereof (the left-hand side as seen in FIG. 1) so as to define a material oil inlet port 12 which is in communication with the inlet chamber 9. The flanges 4 and 5 which define the backflow washing filtrate inlet chamber 10 also have extensions which extend outwardly of the housing 1 on the opposite side thereof (the right-hand side as seen in FIG. 1) so as to define a pressurized filtrate inlet port 15 which communicates on one hand with the backflow washing filtrate inlet chamber 10 and on the other hand with the discharge side a pump C of which will be described hereinafter. The side wall of the housing 1 is further provided with a sludge discharge port 16 on one side (the left-hand side as seen in FIG. 1) in a position right above the bottom wall 6 and the sludge discharge port is in communication with the condensation chamber 11. The bottom wall 6 has a vertical upwardly extending cylindrical extension in the longitudinal center of the housing which has a thicker annular guide 59 at its upper end. This cylindrical extension defines a backflow washing filtrate outlet chamber 17. The lower end of the side wall of the cylindrical extension is terminated on one side (the right hand side) short of the bottom wall 6 and is connected to the inner end of a radially and inwardly extending flange. The outer end of the flange is connected to the side wall of the housing 1. The flange is positioned above and in a spaced relationship to the bottom wall 6 so as to define a communication passage 18 which communicates by means of a fitting with the backflow washing filtrate outlet chamber 17 and a backflow washing filtrate outlet port 14 which will be described hereinafter.

Figure 3:
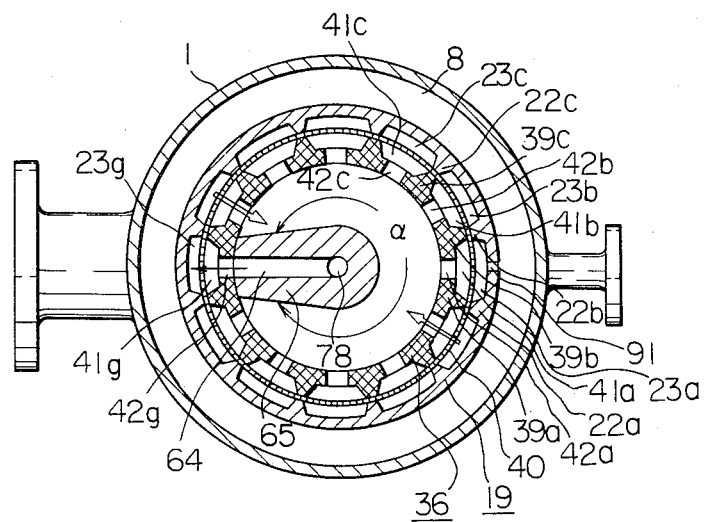
FIG. 3 is a cross-sectional view taken substantially along the line B — B of FIG. 1.
Figure 4:
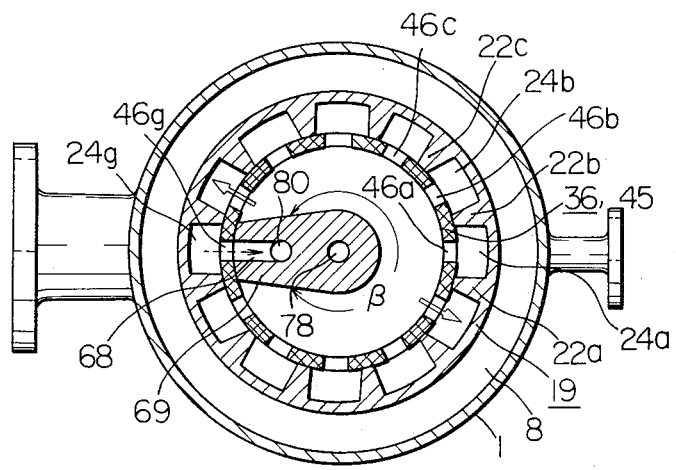
FIG. 4 is a cross-sectional view taken substantially along the line C — C of FIG. 1.
Figure 5:
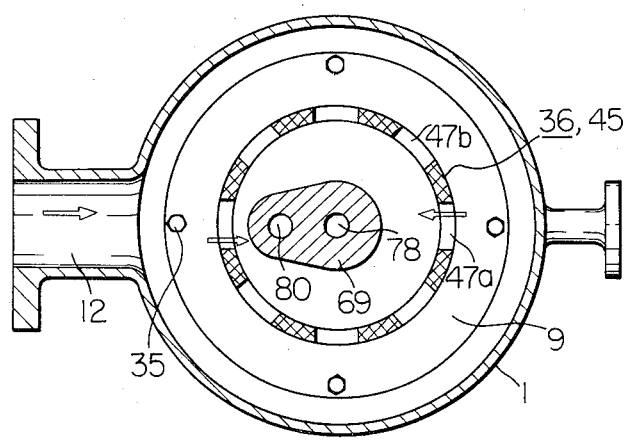
FIG. 5 is a cross-sectional view taken substantially along the line D — D of FIG. 1.
Figure 6:
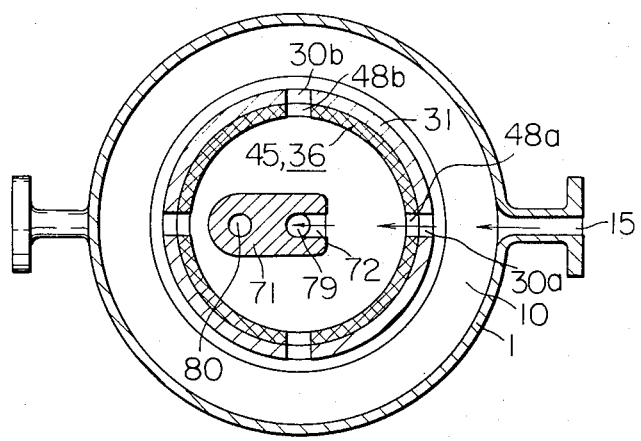
FIG. 6 is a cross-sectional view taken substantially along the line E — E of FIG. 1.
Figure 7:
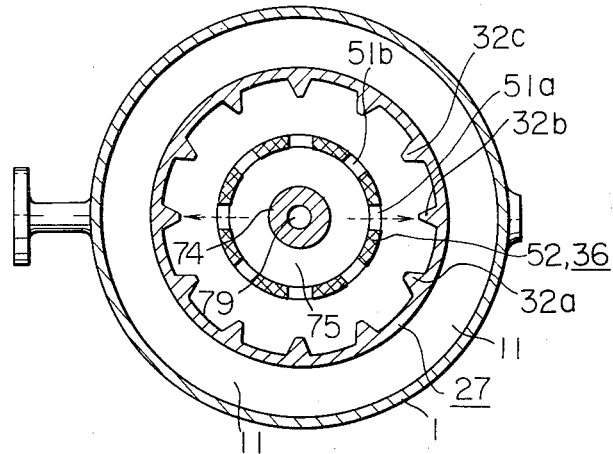
FIG. 7 is a cross-sectional view taken substantially along the line F — F of FIG. 1.
Figure 8:
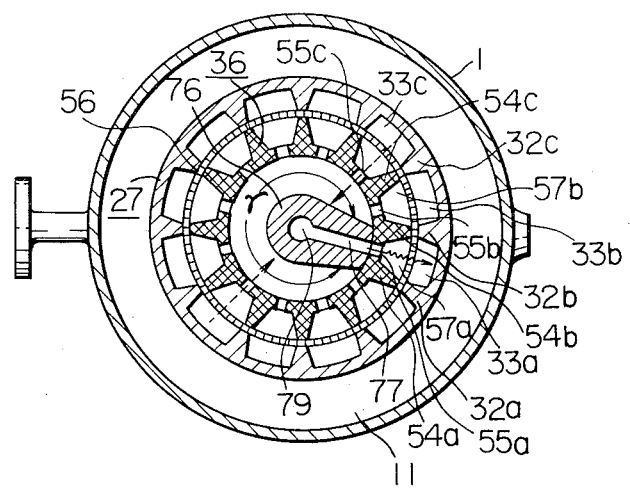
FIG. 8 is a cross-sectional view taken substantially along the line G — G of FIG. 1.
Figure 9:
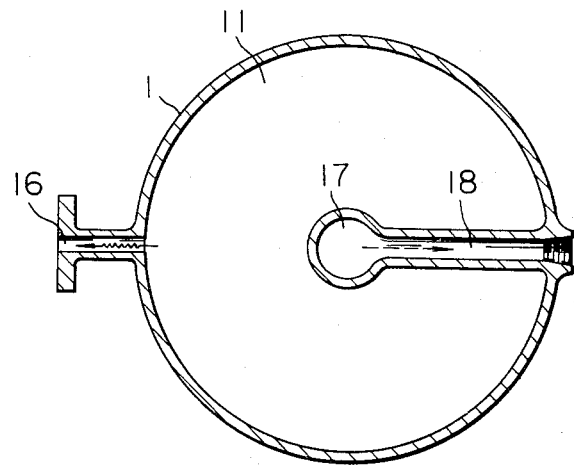
FIG. 9 is a cross-sectional view taken substantially along the line H — H of FIG. 1.

A substantially cylindrical primary filtering screen receiving member 19 has an upper annular flange 20 which is secured to the annular flange 2 of the housing 1 by means of set bolts 26 (only one of such set bolts 26 is shown in FIG. 1) and a lower annular flange 21 which is snugly fitted in the annular flange 3 of the housing. The inner cylindrical surface portion of the primary filtering screen receiving member 19 between the upper flange 20 and lower flange 21 serves as a primary filtering area and is provided with a plurality of radially and inwardly extending ribs 22a, 22b, 22c, etc., having a substantially trapezoidal shape in an equally spaced relationship around the filtering area (the number of such ribs is 12 in the illustrated embodiment) so as to define individual isolated primary filtering chambers 23a, 23b, 23c, etc., between the adjacent ribs as seen in FIGS. 3 and 4, respectively.

Similarly, a substantially cylindrical secondary filtering screen receiving member 27 is provided below and in axial alignment with the primary filtering screen receiving member 19 and has an upper annular flange 28 which is secured to the annular flange 4 of the housing 1 by means of set screws 35 (only one of the screws is shown in FIG. 1) and a lower annular flange 29 which is snugly fitted in the annular flange 5 of the housing.

The section 31 of the secondary filtering screen receiving member 27 between the upper and lower flanges 28 and 29 is provided on the outer periphery thereof with an annular communication passage 30 which is in communication with the backflow washing filtrate chamber. The section 31 of the secondary filtering screen receiving member 27 is also provided with a plurality of equally spaced through openings 30a, 30b, etc., by which the interior of the secondary filtering screen receiving member 27 communicates with the backflow washing filtrate inlet chamber 10. The inner surface of the secondary filtering screen receiving member 27 is also provided, in a position below the lower flange 29, with a plurality of substantially trapezoidal shaped ribs 32a, 32b, 32c, etc., which extend radially and inwardly (the number of such ribs 32 is equal to the number of ribs 22 on the primary filtering screen receiving member 19). The ribs 32a, 32b, 32c, etc., are respectively angularly deviated by one half pitch relative to the respective ribs 22a, 22b, 22c, etc., of the primary filtering screen receiving member 19.

A vertical filtering screen support member 36 is coaxially disposed within the primary and secondary filtering screen receiving members 19 and 27 and comprises a cylindrical frame member which has an upper flange 37 secured to the upper annular flange 20 of the primary filtering screen receiving member 19 by means of set screws 44 (only one of such set screws 44 is shown in FIG. 1) and a lower annular flange 38 facing the inner surface of the primary filtering screen receiving member 19 in a spaced relationship thereto. The cylindrical frame member also has a plurality of radially and outwardly extending ribs 39a, 39b, 39c, etc., having a substantially trapezoidal shape (the number of such ribs 39 is twelve in the illustrated embodiment). These ribs 39a, 39b, 39c, etc., are in contact with the associated ribs 22a, 22b, 22c, etc., respectively thereby defining a corresponding number of individual isolated filtering chambers 41a, 41b, 41c, etc. The side wall of the cylindrical frame member is further provided with a plurality of slits 42a, 42b, 42c, etc. each being positioned between each two adjacent ribs 39a, 39b, 39c, etc. Thus, it will be seen that each of the slits communicates between the interior of the cylindrical frame member and each of the associated isolated filtering chambers 41. The primary filtering screen 40 is stretched about the section of the cylindrical frame member between the upper and lower annular flanges 37 and 38 and has its opposite sides with all the ribs 22a, 22b, 22c, etc., and the ribs 39a, 39b, 39c, etc. The screen 40 is secured at the upper and lower ends to the upper and lower flanges 37 and 38 of the cylindrical frame member. The cylindrical frame member of the primary filtering screen support member 36 has an intermediate section 45 below the lower flange 38 which is in contact with the inner surface of the primary filtering screen receiving member lower flange 21 and with the inner surfaces of the secondary filtering screen receiving member upper and lower flanges 28 and 29. The side wall of the intermediate section 45 of the cylindrical frame member is provided, in a position between the lower flange 21 of the primary filtering screen receiving member 19 and the lower flange 38 of the cylindrical frame member 36, with a plurality of slits 46a, 46b, 46c, etc., which correspond to the slits 42a, 42b, 42c, etc., in both position and number. The screen support frame member intermediate section is further provided, in a position opposite to the inlet chamber 9 or right above the upper flange 28 of the secondary screen receiving member, with a plurality of equally spaced guide openings 47a, 47b, 47c, etc. In addition, screen support frame member intermediate section 45 is provided, in a position between the upper and lower flanges 38 and 39 of the secondary filtering screen receiving member 27, with a plurality of openings 48a, 48b, 48c, etc. These are in alignment with the respectively corresponding backflow washing filtrate inlets 30a, 30b, 30c, etc., in the secondary filtering screen receiving member 27. The cylindrical screen support frame member also has a lowermost section 52 of reduced diameter which is connected at the upper end to the lower end of the intermediate section 45 through a shoulder 49 and which has an upper annular flange 50 below and spaced from the shoulder. The side wall of the lowermost frame member section 52 is provided with a plurality of spaced backflow washing filtrate inlet ports 51a, 51b, 51c, etc. The lowermost frame member section 52 further has a lower annular flange 53 below and spaced from the upper flange 50 and a plurality of equally spaced radially and outwardly extending ribs 54a, 54b, 54c, etc., which correspond to the primary filtering ribs 39a, 39b, 39c, etc., in both shape and number. The side wall of the lowermost frame member section 52 is provided with a plurality of equally spaced slits 55a, 55b, 55c, etc., with one slit positioned between each two adjacent ribs 54. A secondary filtering screen 56 is stretched about the lowermost frame member section 52 between and secured to the upper and lower flanges 50 and 53 in contact with the opposing ribs 39a, 39b, 39c, etc., and 54a, 54b, 54c, etc. It is to be noted that the ribs, 54a, 54b, 54c, etc., deviate respectively by one half pitch relative to the respective ribs, 32a, 32b, 32c, etc.

Thus, the ribs 54a, 54b, 54c, etc., and the secondary filtering screen 56 define a plurality of individual isolated filtering chambers 57a, 57b, 57c, etc. The bottom of the lowermost cylindrical frame member section is partially covered by an annular member 58 which has a downwardly extending tubular extension fitted in the guide portion 59 of the backflow washing filtrate outlet chamber 17 and which defines a filtrate passage 60.

A rotary backflow washing cock is vertically provided within the filtering screen support frame assembly 36 and is generally indicated by reference numeral 61. The backflow washing cock 61 is shown in cross-section in FIGS. 1 – 8 and in elevation in FIGS. 10A, 10B and 10C. The cock 61 generally comprises a first cock section 65, a second cock section 69, a third cock section 71, a fourth cock section 74 and a fifth cock section 76 which are integrally formed with each other. The first cock section 65 includes upper and lower discs 62 and 63 which respectively fit in the upper and lower annular flanges 37 and 38 of the filtering screen support frame member and a backflow washing filtrate outlet port 64, having an opening angle $\alpha$, between the discs and in communication with a selected one of the slits 52 in the filtering screen support frame section 45. The disc 62 is provided with a backflow washing filtrate outlet port 66. The second cock section 69 extends between the disc 63 and a disc 67 on the same vertical plane as the first cock section 65 in a position above the backflow washing filtrate inlet port 48 and has a secondary screen backflow washing filtrate outlet port 68 which has an opening angle $\beta$ corresponding to the opening angle $\alpha$ and is positioned on the side opposite the backflow washing filtrate inlet port 64. The third cock section 71 is positioned between the disc 67 and a disc 70 positioned below and spaced from the disc 67. The third cock section lies on the same vertical plane as the first and second cock sections 65 and 69 and has a backflow washing filtrate communication port 72. The lowermost or fourth cock section 74 is in the form of a cylinder and extends between the disc 70 and a disc 73 positioned below and spaced from the disc 70. A backflow washing filtrate inlet chamber 75 is defined by the fourth cock section 74 and the cylindrical screen support frame member. The fifth cock section 76 extends downwardly from the disc 73 and has an opening angle $\gamma$. This section is provided with a backflow washing filtrate outlet port 77 which is in alignment with the slits 56 in the cylindrical screen support frame member for washing the secondary filtering screen. The backflow washing filtrate outlet port 64 in the first cock section 65 and the backflow filtrate inlet port 72 in the third cock section 71 communicate with each other by means of a communication passage 78 and similarly, the backflow washing filtrate inlet 72 and the secondary filtering screen backflow washing filtrate outlet port 77 communicate with each other by means of a communication passage 79. The secondary filtering screen backflow washing inlet port 68 in the second cock section 69 and the secondary filtering backflow washing filtrate chamber 75 communicate with each other by means of a communication passage 80. All of the discs 62, 63, 67, 70 and 73 fit in the cylindrical filtering screen support frame.

The intergral cock 61 as described hereinabove is drivingly connected to the output shaft 82 of an electric motor or oil pressure-operated actuator (not shown) to be driven at a low rate within the cylindrical filtering screen support frame 36. It should be noted that the cock 61 is not continuously rotated, but is intermittently rotated so that as the cock is rotated each of the openings in the cock may pause on one selected slit of the slits in the filtering screen support frame member thereby to improve the backflow washing performance of the filter. The housing 1 has an open top which is normally covered by a lid 83 which is secured to an annular top of the housing by means of set bolts 85 (only one of such set bolts is shown in FIG. 1) with a gasket 84 interposed therebetween. A positioning collar 86 is disposed in a recess formed in the lid 83 for maintaining a fluid passage 87 defined by the annular member 58 on the filtering screen support frame member and the lowermost or fifth cock section 76 of the cock 61. A gland packing 88 is also disposed within the recess over the positioning collar 86 which is held in position by a gland nut 89 threaded to fit in a threaded inner surface of the recess in the lid 83. A backflow washing filtrate recycling pipe 90 extends between the communication passage 18 defined by the bottom wall 6 and the adjacent flange of the housing and the backflow washing filtrate outlet 14. This pipe is shown in FIG. 11 by G. An aperture 91 is provided in the side wall of the cylindrical filtering screen receiving member 19 for balancing the pressure between the filtering chamber 8 and that within an annular independent filtering chamber 23 defined by the primary filtering screen receiving member 19 and the filtering screen support frame member 36.

In operation, the cock 61 is rotated at a low rate by the motor (not shown) and the material oil to be filtered is first sucked from a tank or reservoir A into the filter B by a pump C (FIG. 11). The sucked material oil enters the filter at the material oil inlet port 12 and flows into the material oil inlet chamber 9. From the inlet chamber 9, the material oil passes through a primary filtering system which comprises the guide openings 47a, 47b, 47c, etc., in the cylindrical screen support frame member 36 (except one of such openings), a space defined by the screen support frame 36 and the second cock section 69, a space defined by the opening β, the slits 46a, 46b, 46c, etc., in the screen support frame member 36, the individual isolated filtering chambers 23a, 23b, 23c, etc., in the filtering screen receiving member 19 and the primary filtering screen 40 which filters the material oil as the oil passes through the screen. After passing the screen 40, the filtrate passes through a recycling system which comprises the individual isolated chambers 41a, 41b, 41c, etc., in the filtering screen support frame member 35, the slits 42a, 42b, 42c, etc., in the filtering screen support frame 36, the opening α in the first cock section 65, the filtrate outlet port 66 in the first cock section 65, the filtrate outlet chamber 7 in the housing 1, the filtrate outlet port 13 in the housing 1 and the pump C from where the filtrate is recycled for backflow. In the illustrated embodiment, the primary filtering of the material oil is effected by the primary filtering screen 40 at areas associated with eleven selected isolated filtering chambers of the twelve chambers 23a, 23b, 23c, etc., and the area of the screen 40 associated with the remaining chamber 23 g (FIG. 3) is employed for the backflow washing operation. That is, the backflow washing is effected by the area of the primary filtering screen 40 associated with the particular isolated chamber 23g which is then in communication with the particular slit 23g, for example, which is in turn communicating with the opening 64 in the first cock section 65. With such an arrangement of the backflow washing system, when the backflow washing filtrate F under pressure is pumped out from the discharge side of the pump C, the backflow washing filtrate passes through a backflow washing system which comprises the backflow washing inlet port 15 and the backflow washing inlet chamber 10 in the housing 1, the guide openings 30a, 30b, etc., in the secondary filtering screen receiving member 27, the guide openings 48a, 48b, etc., in the filtering screen support frame member 36, the backflow washing filtrate guide openings 72, 78 and 64 in the cock 61 and the slit 42g in the screen support frame member 36. As the backflow washing filtrate flows through the backflow washing system described above, the foreign matter which has been separated from the material oil and deposited on the primary filtering screen 40 as the oil passed the screen is removed from the screen by the backflow washing filtrate due to the difference between the pressure on the suction side and that on the discharge side of the pump C. The thus separated foreign matter is entrained in the backflow washing filtrate. The foreign matter-laden filtrate then passes through a secondary filtering system which comprises the selected isolated filtering chambers 23g and 24g in the filtering screen receiving member 19, for example, the selected slit 46g in the screen support frame member 36, the backflow washing filtrate opening 68, communication passage 80 and backflow washing filtrate chamber 75, and backflow washing filtrate guide openings 51a and 51b in the cock 61, the isolated filtering chambers 33b and 33c between the secondary filtering screen receiving member 27 and screen support frame member 36 and the secondary filtering screen 56 where the backflow filtrate is separated from its entrained foreign matter. After passing the secondary filtering screen 56, the filtrate passes through a secondary recycling system which comprises the slits 55b and 55c in the screen support frame member 36, the opening α in the cock 61, the passage 87 defined between the cock and screen support frame member 36, the outlet opening 60 in the screen support frame member 36, the backflow filtrate outlet chamber 17 and communication passage 18 in the housing 1 and the recycling pipe 90 from where the filtrate is passed to the filtrate outlet port 13 where the filtrate is combined with the filtrate from the primary filtering screen 40. The combined filtrate is then passed to the pump C.

In this way, a substantial area of the secondary filtering screen 56 which is associated with the selected eleven isolated filtering chambers of the twelve filtering chambers 33b, 33c, etc., for example, is washed by the backflow washing filtrate whereas the remaining area of the filtering screen 56 associated with the one particular filtering chamber 67a which is then in communication with the backflow washing filtrate outlet port 77, for example, is washed by the filtrate under pressure pumped from the discharge side of the pump C. The backflow washing filtrate under pressure from the pump passes through a secondary filtering screen backflow washing system which comprises the backflow washing filtrate inlet port 15 in the housing 1, the openings 30a, 30b, etc., in the secondary screen receiving member 27, the openings 48a, 48b, etc., in the screen support frame member 36, the backflow washing filtrate guide opening 72 and guide opening 79 in the cock 61 and the slit 55a. From the slit 55a, the backflow washing filtrate passes through the secondary filtering screen 56 to remove foreign matter deposited on the screen and the thus separated foreign matter is allowed to deposit and concentrate on the bottom of the housing 1. As mentioned hereinabove, since the adjacent filtering chambers 33a, 33b, 33c, etc., are completely isolated from each other by the individual ribs 32a, 32b, 32c, etc., the separated foreign matter from each chamber will be effectively prevented from entering the other filtering chambers.

As the concentration of foreign matter deposited on the bottom of the filter housing 1 increases, the filtering efficiency of the backflow washing filtrate decreases accordingly which will result in the lowering of the filtering capacity of the secondary filtering screen. Therefore, according to the present invention, a drain valve H is provided in a suitable position of the housing 1 for discharging the deposited foreign matter from the housing. The filtrate, from which foreign matter has been completely separated after passing through the primary filtering screen, or secondary filtering screen is passed to a consuming device E (FIG. 11). The drain valve H may be either automatically or manually operated. Thus, according to the present invention, there is no possibility of clogging of the filtering screens and the screens can satisfactorily perform filtering throughout their service life.

There has been described and shown one preferred embodiment of the invention, but it will be obvious to those skilled in the art that various changes and modifications may be made therein without departing from the invention, and it is aimed, therefore, in the appended claim to cover all such changes and modifications as fall within the true spirit and scope of the invention.

What we claim is:

1. An automatic continuous backflow washing type filter for use on the suction side of a pump comprising a vertically cylindrical housing the side wall of which is provided with four intergral radially and inwardly extending annular flanges positioned at different heights on said side wall and a bottom wall, a filtrate outlet chamber defined within said housing above the uppermost of said flanges, a filtering chamber defined between said uppermost flange and the flange right below the uppermost flange, a material oil inlet chamber defined between said second higher flange and the flange right below the second higher flange, a backflow washing filtrate inlet chamber defined between said third higher flange and the lowermost flange, a condensation chamber defined between said lowermost flange and bottom wall, a sludge discharge port provided adjacent said bottom wall in communication with said condensation chamber, a primary filtering screen receiving member being receivable in said housing between said two upper flanges and having upper and lower annular flanges securable to the two housing flanges and a plurality of radially and inwardly extending ribs, a secondary filtering screen receiving member received within said housing and extending downwardly from said third-mentioned housing flange toward said housing bottom wall beyond said lowermost housing flange, said secondary filtering screen receiving member being provided with upper and lower annular flanges which are secured to said third-mentioned housing flange and fitted in said lowermost housing flange, respectively and a plurality of ribs radially and inwardly extending, a filtering screen support member extending vertically within said first and second filtering screen receiving members and having an uppermost radially and outwardly extending annular flange secured to said upper flange on the primary filtering screen receiving member, a second radially and outwardly extending higher annular flange positioned between the two upper flanges of the primary filtering screen receiving member and spaced from the side wall of the associated screen receiving member and third and fourth radially and outwardly extending annular flanges positioned below said lower flange of the secondary filtering screen receiving member and spaced from the side wall of the associated screen receiving member, said filtering screen support member being further provided with a plurality of radially and outwardly extending ribs between said first and second flanges on the screen support member, backflow washing filtrate inlet ports positioned between said upper and lower flanges on the secondary filtering screen receiving member, guide openings positioned just above said upper flange on the secondary filtering screen receiving chamber, slit groups positioned at different heights in the screen support member and guide openings in communication with a backflow washing filtrate outlet chamber provided in said housing, a primary filtering screen secured to said two upper flanges on the filtering screen support member, a secondary filtering screen secured to said two lower flanges on the filtering screen support member, and a rotary backflow washing cock extending vertically within said filtering screen support member and having a plurality of integral cock sections defined by a plurality of discs and provided with a plurality of communications openings therein, the uppermost disc of said plurality of discs having a filtrate outlet, said uppermost and next higher discs being loosely fitted in the screen receiving member in the positions corresponding to said two upper flanges on the screen support member and defining a relatively large opening port on one side and a backflow washing filtrate outlet port on the opposite side which is in communication with one of said communication openings, the second and third higher discs defining an opening port having the same opening angle as said first-mentioned opening port on one side and a backflow washing filtrate inlet port on the other side which is in communication with another one of said communication openings, the third and fourth higher discs defining a backflow washing filtrate guide opening which is in communication with the last one of said communication openings and a backflow washing filtrate outlet port extending below the lowermost disc.

* * * * *